(12) United States Patent
Nakamaru et al.

(10) Patent No.: US 10,962,074 B2
(45) Date of Patent: Mar. 30, 2021

(54) VIBRATION-DAMPING DEVICE

(71) Applicant: YAMASHITA RUBBER CO., LTD., Fujimino (JP)

(72) Inventors: Yuichi Nakamaru, Saitama (JP); Hiroki Kashihara, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 55 days.

(21) Appl. No.: 16/340,885

(22) PCT Filed: Oct. 12, 2017

(86) PCT No.: PCT/JP2017/037091
§ 371 (c)(1),
(2) Date: Apr. 10, 2019

(87) PCT Pub. No.: WO2018/070504
PCT Pub. Date: Apr. 19, 2018

(65) Prior Publication Data
US 2019/0234476 A1    Aug. 1, 2019

(30) Foreign Application Priority Data
Oct. 12, 2016    (JP) .................................. 2016-201038

(51) Int. Cl.
*F16F 1/38*    (2006.01)
*F16F 15/08*    (2006.01)
*F16F 1/387*    (2006.01)

(52) U.S. Cl.
CPC ............ *F16F 1/3863* (2013.01); *F16F 1/387* (2013.01); *F16F 15/08* (2013.01); *F16F 2224/02* (2013.01); *F16F 2224/025* (2013.01)

(58) Field of Classification Search
CPC ........ F16F 1/387; F16F 1/3807; F16F 1/3863; F16F 2224/02; F16F 2224/025
USPC ..................... 267/141.1, 141.2, 141.3, 141.4
See application file for complete search history.

(56) References Cited

U.S. PATENT DOCUMENTS 2,562,381 A * 7/1951 Goldsmith ............ F16F 1/3863
                                                        403/226
4,634,108 A * 1/1987 Munch .................. F16O 27/063
                                                        267/279
5,246,248 A * 9/1993 Ferguson ............. B60G 21/051
                                                        267/141.3

(Continued)

FOREIGN PATENT DOCUMENTS

DE    10 2004 045 669         4/2006
DE       102010005005 B4 *    2/2014    .............. F16F 1/387

(Continued)

OTHER PUBLICATIONS

International Search Report, dated Dec. 19, 2017 (Dec. 12, 2017), 2 pages.

*Primary Examiner* — Thomas J Williams
(74) *Attorney, Agent, or Firm* — Rankin, Hill & Clark LLP

(57) ABSTRACT

An object of the present invention is to provide a vibration-damping device which enhances the durability of a rubber elastic body; and inhibits the occurrence of voids in an outer cylinder. The vibration-damping device includes: an inner cylinder; a resin-made outer cylinder arranged outside the inner cylinder in a radial direction of the outer cylinder; and a rubber elastic body connecting the inner cylinder and the outer cylinder.

1 Claim, 8 Drawing Sheets

(56) References Cited

U.S. PATENT DOCUMENTS

| | | | | |
|---|---|---|---|---|
| 5,338,012 | A * | 8/1994 | Kranick | B60G 3/04 267/140.5 |
| 6,022,626 | A * | 2/2000 | Guo | C09D 111/00 428/492 |
| 7,021,613 | B2 * | 4/2006 | Mikami | B60G 21/0551 267/140.12 |
| 7,306,209 | B2 * | 12/2007 | Vossel | F16F 13/14 267/140.13 |
| 8,181,945 | B2 * | 5/2012 | Miyahara | F16F 1/387 267/140.12 |
| 10,704,637 | B2 * | 7/2020 | Zimmerman | F16F 1/3842 |
| 2008/0284076 | A1 | 11/2008 | Miyahara et al. | |
| 2012/0018937 | A1 | 1/2012 | Namito | |
| 2015/0323029 | A1 | 11/2015 | Yahata | |
| 2015/0323031 | A1 * | 11/2015 | Yahata | F16F 1/3863 267/141.2 |
| 2019/0234483 | A1 * | 8/2019 | Nakamaru | F16F 1/38 |
| 2019/0242454 | A1 * | 8/2019 | Nakamaru | F16F 1/38 |

FOREIGN PATENT DOCUMENTS

| | | | | |
|---|---|---|---|---|
| DE | 102016124699 | B3 * | 6/2018 | ............ F16C 33/20 |
| EP | 1319861 | A3 * | 12/2003 | ............ F16F 1/3863 |
| FR | 3 029 997 | | 6/2016 | |
| JP | H01-120764 | | 6/1991 | |
| JP | 2002-276714 | | 9/2002 | |
| JP | 2008-286345 | | 11/2008 | |
| JP | 2010-223393 | | 10/2010 | |
| JP | 2015-64012 | | 4/2015 | |
| WO | WO-2006090720 | A1 * | 8/2006 | ............ F16F 1/3849 |

\* cited by examiner

VIBRATION-DAMPING DEVICE

TECHNICAL FIELD

The present invention relates to a vibration-damping device with a rubber elastic body provided between an inner cylinder and an outer cylinder.

BACKGROUND ART

A vibration-damping device incorporated in an engine mount or the like of an automobile has been known as this type of vibration-damping device. This vibration-damping device includes: an inner cylinder; an outer cylinder arranged around the outer circumference of the inner cylinder with a space in between; and a rubber elastic body which elastically connects the inner cylinder and the outer cylinder.

A reduction in the weight of an automobile in recent years has encouraged consideration for the use of resin members in the vibration-damping device.

For example, a vibration-damping device disclosed in Patent Literature 1 employs a resin-made outer cylinder. The outer cylinder of this vibration-damping device includes a portion with a large thickness, and a portion with a small thickness.

Regarding this type of vibration-damping device, generally, uncured rubber elastic body is poured between the inner cylinder and the outer cylinder, and after the pouring, the rubber elastic body is cured. This curing bonds the rubber elastic body to the inner cylinder and the outer cylinder.

In a conventional vibration-damping device, the rubber elastic body after the cured bonding may be subjected to tensile stress remaining in a radial direction. This causes a problem with the durability of the rubber elastic body. To solve this problem, in a vibration-damping device employing a metal-made outer cylinder, compressive force is applied to the rubber elastic body after the cured bonding to reduce or remove the tensile stress remaining in the rubber elastic body after the cured bonding. The application of the compressive force is done by drawing the outer cylinder to reduce the diameter of the outer cylinder.

CITATION LIST

Patent Literature

Patent Literature 1: JP 2002-276714 A

SUMMARY OF INVENTION

Technical Problem

Regarding the vibration-damping device employing a resin-made outer cylinder, however, the diameter of the resin-made outer cylinder cannot be reduced by drawing the outer cylinder, unlike the metal-made outer cylinder. Against the above background, the vibration-damping device employing the resin-made outer cylinder requires the durability to be enhanced by reducing or removing the tensile stress which remains in the rubber elastic body after the cured bonding.

In the conventional vibration-damping device, voids may occur at the part of the outer cylinder with the large thickness.

The present invention has been made in order to solve the above problems. An object of the present invention is to provide a vibration-damping device which is capable of: enhancing the durability of a rubber elastic body; and concurrently inhibiting the occurrence of voids and the like in an outer cylinder.

Solution to Problem

To solve the above problem, a vibration-damping device according to the present invention includes: an inner cylinder; a resin-made outer cylinder arranged outside the inner cylinder in a radial direction of the outer cylinder; and a rubber elastic body connecting the inner cylinder and the outer cylinder. The outer cylinder includes: a press fitted part to be press-fitted into an attachment insertion hole formed in an attachment member; a drawn part continuing from the press fitted part, and tapered with its diameter becoming smaller; and a cylindrical part extending from a small-diameter end portion of the drawn part in a press-fitting direction in which the cylindrical part is to be press-fitted into the attachment member. The cylindrical part includes projecting parts which jut out in an axial direction of the cylindrical part. The projecting parts are formed in a pair in a radial direction of the cylindrical part.

In the vibration-damping device like this, spring force of the rubber elastic body can be increased by the existence of the pair of projecting parts in the cylindrical part. This makes it possible to favorably absorb load which is inputted into the vibration-damping device. Meanwhile, since the pair of projecting parts are formed in the cylindrical part, a pair of recess-shaped parts, which are set further back in the axial direction of the cylindrical part than the pair of projecting parts, are formed in the cylinder part. Portions of the rubber elastic body, which correspond to the recess-shaped parts in the cylindrical part, no longer get caught between or bonded to the inner cylinder and the outer cylinder. In other words, portions of the rubber elastic body, which are arranged in the recess-shaped parts in the cylindrical part, do not get caught between the inner cylinder and the outer cylinder, and accordingly, residual stress is less likely to occur. The residual stress is, therefore, less influential even in a case of receiving load which may largely displace the portions of the rubber elastic body arranged in the recess-shaped parts in the cylindrical part. This makes it possible to achieve an enhancement in the durability of the rubber elastic body.

It should be noted that the cylindrical part is a part to which load is likely to be applied while the vibration-damping device is in operation. For this reason, the vibration-damping device according to the present invention, having the structure which makes residual stress less likely to occur in this part, is effective in achieving an enhancement in the performance and an improvement in the durability.

Furthermore, in the vibration-damping device, the outer cylinder includes recessed parts which are recessed in a radial direction of the outer cylinder. The vibration-damping device with the structure like this makes it possible to increase strength of the outer cylinder. Moreover, this vibration-damping device makes it possible to form the outer cylinder whose thickness is substantially even across the outer cylinder, unlike the outer cylinder which would be formed thicker in order to increase the strength. This makes shrinkage in the molded resin substantially constant across the outer cylinder, and makes it possible to inhibit the occurrence of sink marks and voids.

Advantageous Effects of Invention

The present invention makes it possible to obtain the vibration-damping device which is capable of: achieving the enhancement in the durability of the rubber elastic body; and concurrently inhibiting the occurrence of voids and the like in the outer cylinder.

DESCRIPTION OF EMBODIMENTS

Hereinafter, embodiments of a vibration-damping device according to the present invention will be described with reference to the accompanying drawings depending on the necessity. Incidentally, in the following descriptions, "front," "rear," "upper," "lower," "left" and "right" from the vibration-damping device are based on the directions indicated in FIG. 1. A left-right direction and a front-rear direction vertically intersect each other on the same plane, while an upper-lower direction vertically intersects the left-right direction and the front-rear direction. In this case, the "front-rear" direction of the vibration-damping apparatus does not necessarily coincide with the front-rear direction of a vehicle body of an automobile.

The vibration-damping device 10 according to the embodiment is provided between a vibration source such as an engine (not shown) and a vehicle body such as a frame which are installed in the automobile.

[Schematic Configuration of Vibration-Damping Device]

Figure 1:
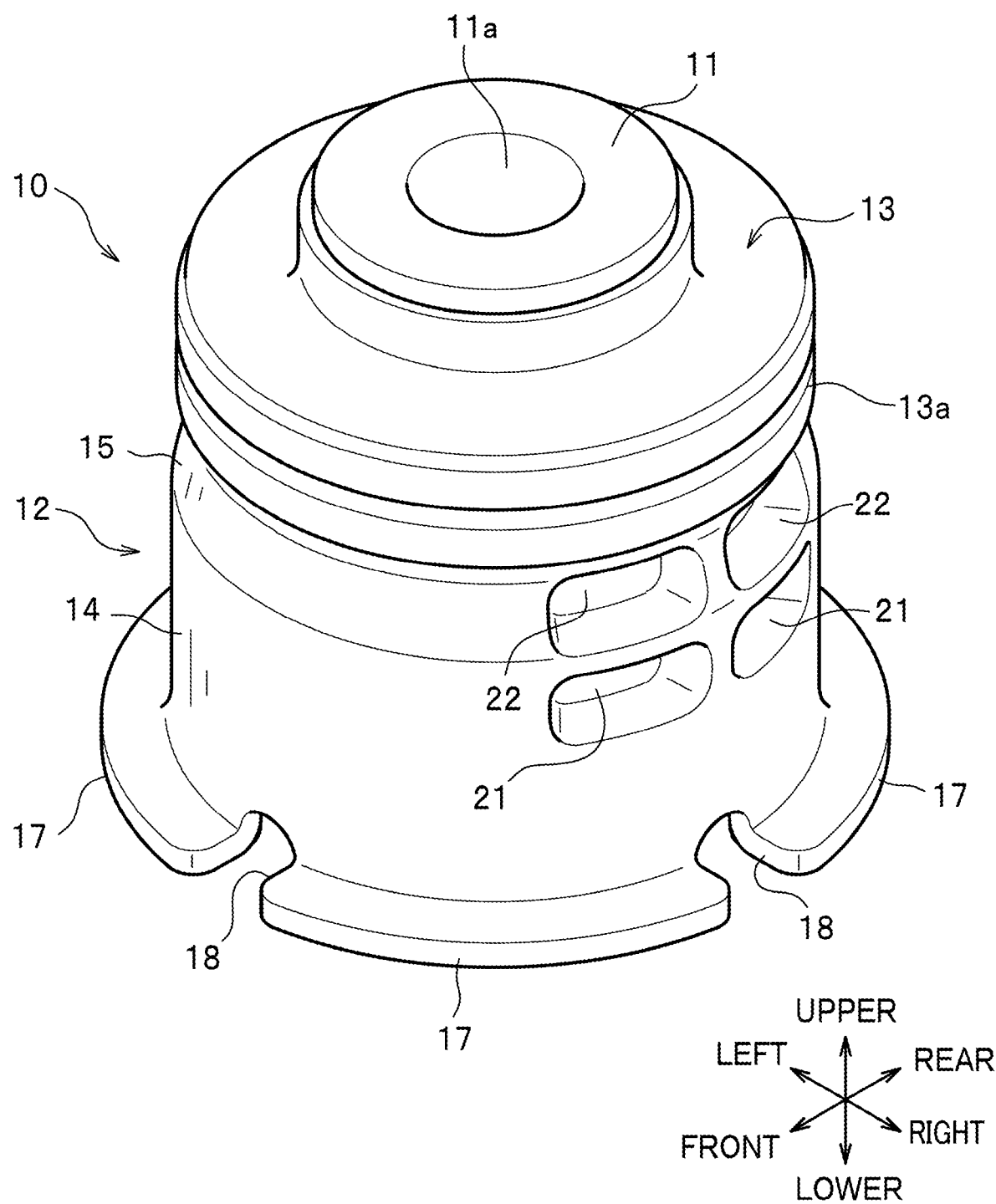
FIG. 1 is a perspective view showing a vibration-damping device according to an embodiment of the present invention.

As shown in FIG. 1, the vibration-damping device 10 includes an inner cylinder 11, an outer cylinder 12, and a rubber elastic body 13. The vibration-damping device 10 is fitted to an attachment insertion hole 51 (see FIG. 8, the same in the below) of an attachment member 50 (a holder, see FIG. 8, and the same in the below), which will be described later.

[Inner Cylinder]

Figure 2A:
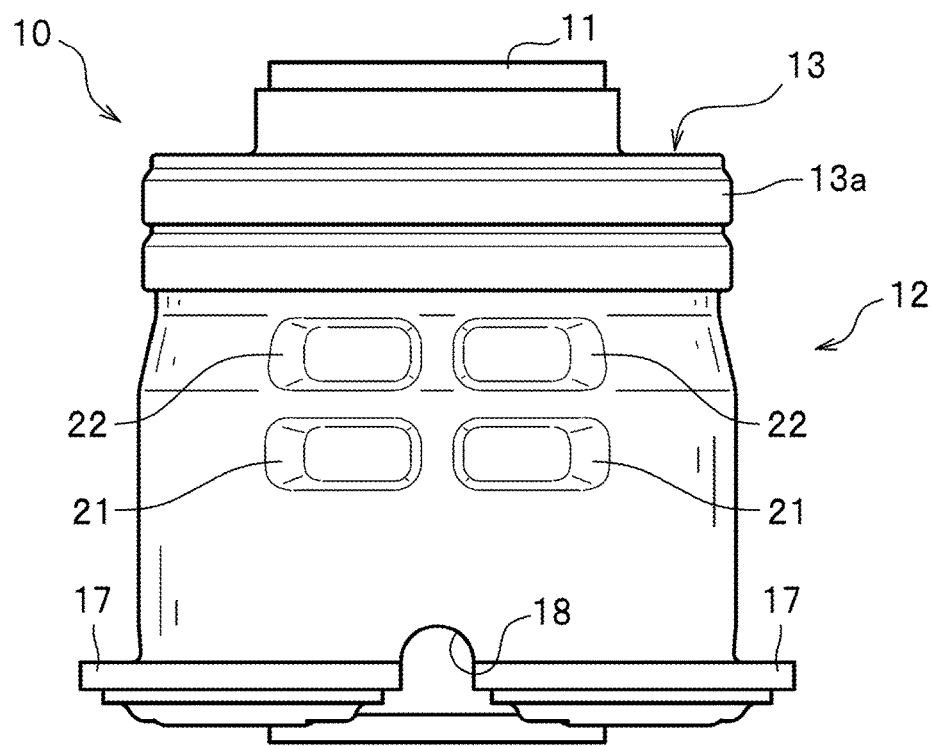
FIG. 2A is a side view of the vibration-damping device.
Figure 2B:
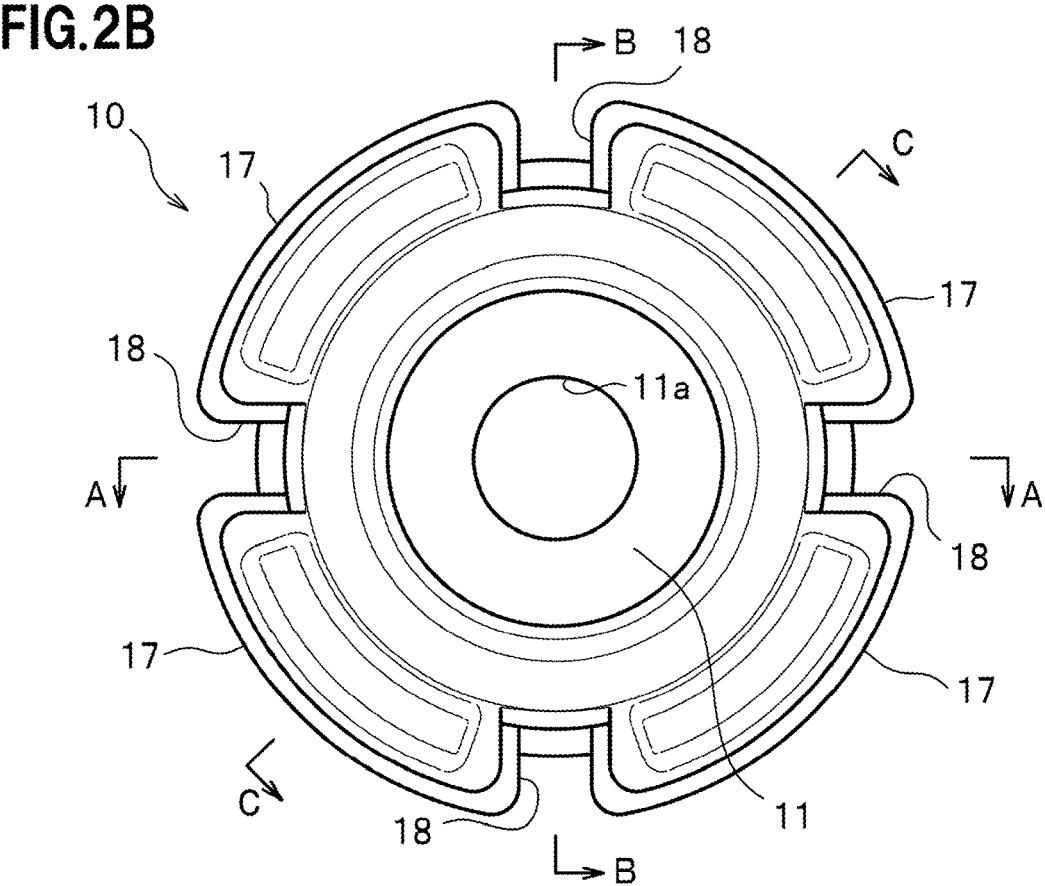
FIG. 2B is a bottom view of the vibration-damping device.

The inner cylinder 11 is a metal-made cylindrical member with a predetermined thickness. The inner cylinder 11 is arranged in a central portion of the vibration-damping device 10. The inner cylinder 11 includes a through-hole 11a formed extending in an axial direction. External dimensions of the inner cylinder 11 are constant from an upper end to a bottom end of the inner cylinder 11 in the axial direction (see FIGS. 3A and 3B). The dimension of the inner cylinder 11 in the axial direction is larger than a dimension of the outer cylinder 12 in the axial direction. As shown in FIG. 2A, two end portions of the inner cylinder 11 jut out from two end portions of the outer cylinder 12. The inner cylinder 11 is fixed to the vehicle body, such as the frame, with a bolt or the like (not shown) which is inserted through the through-hole 11a.

[Schematic Configuration of Outer Cylinder and Configuration of Attachment Member]

Figure 3A:
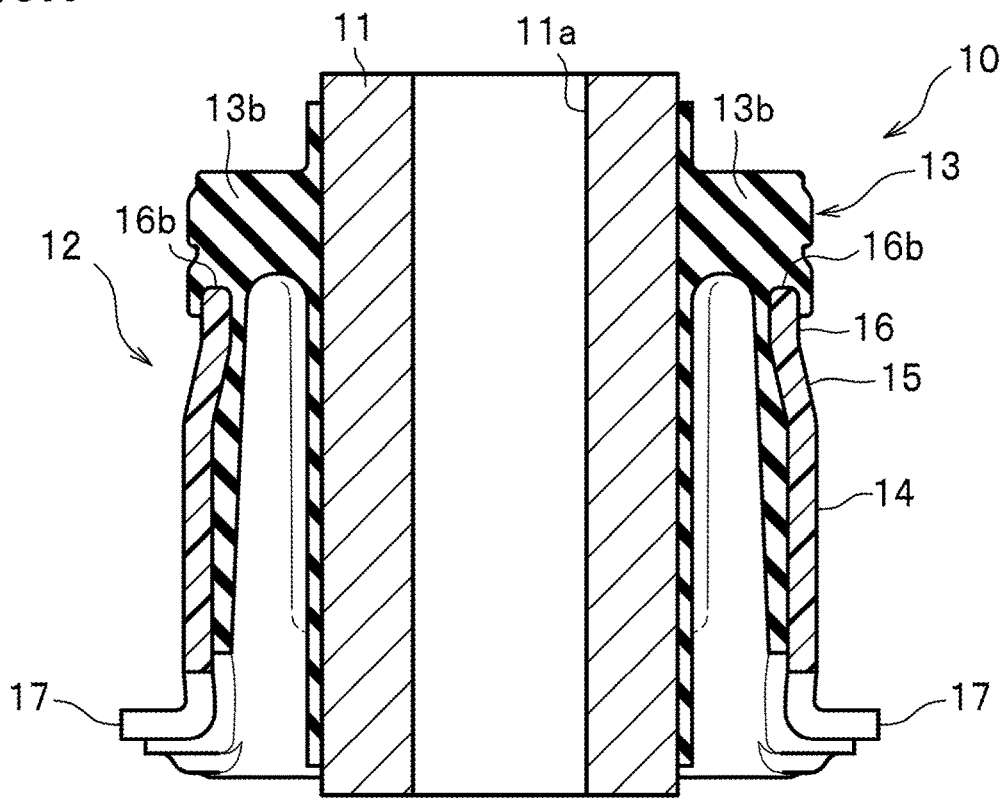
FIG. 3A is a cross-sectional view taken along the A-A line of FIG. 2B.
Figure 4:
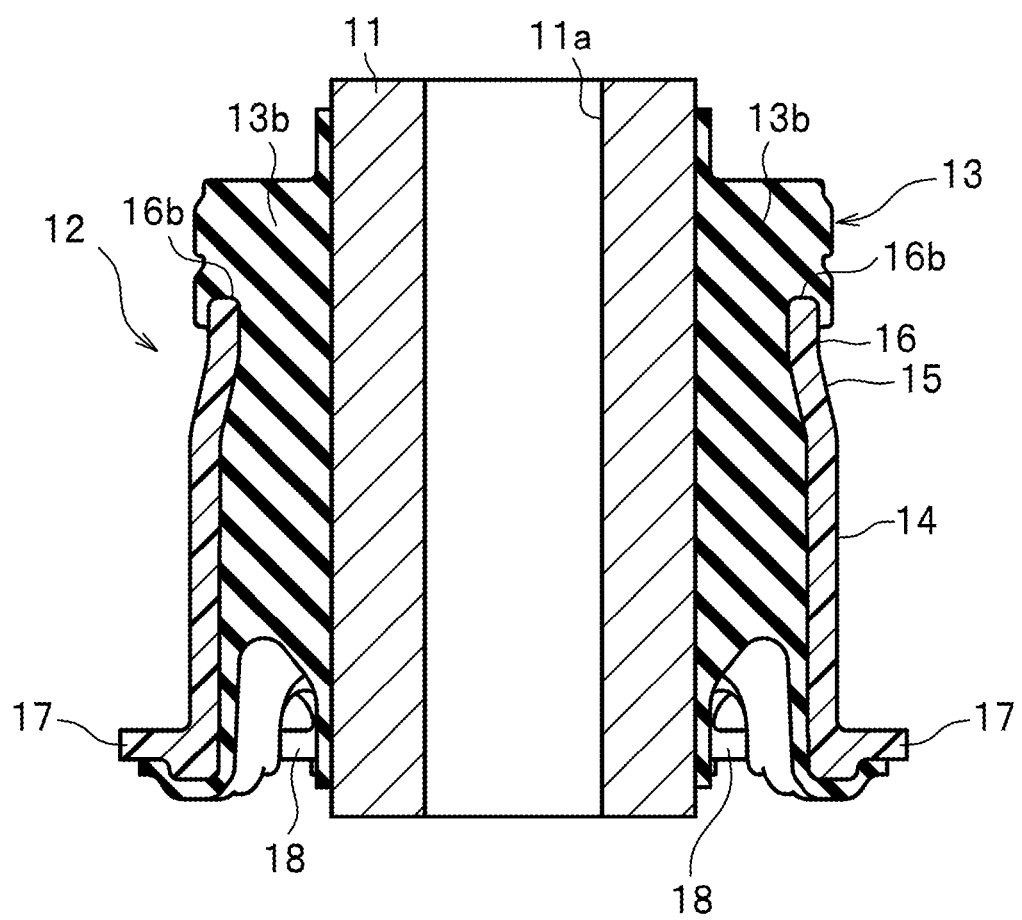
FIG. 4 is a cross-sectional view taken along the C-C line of FIG. 2B.

The outer cylinder 12 is a resin-made cylindrical member which is thinner than the inner cylinder 11. The outer cylinder 12 is, for example, an injection-molded product formed by injection molding. As shown in FIGS. 3A and 4, the outer cylinder 12 is arranged outside the inner cylinder 11 in a radial direction with a space in between, and forms an outer shell of the vibration-damping device 10. In other words, the inner cylinder 11 is arranged inside the outer cylinder 12.

Figure 5:
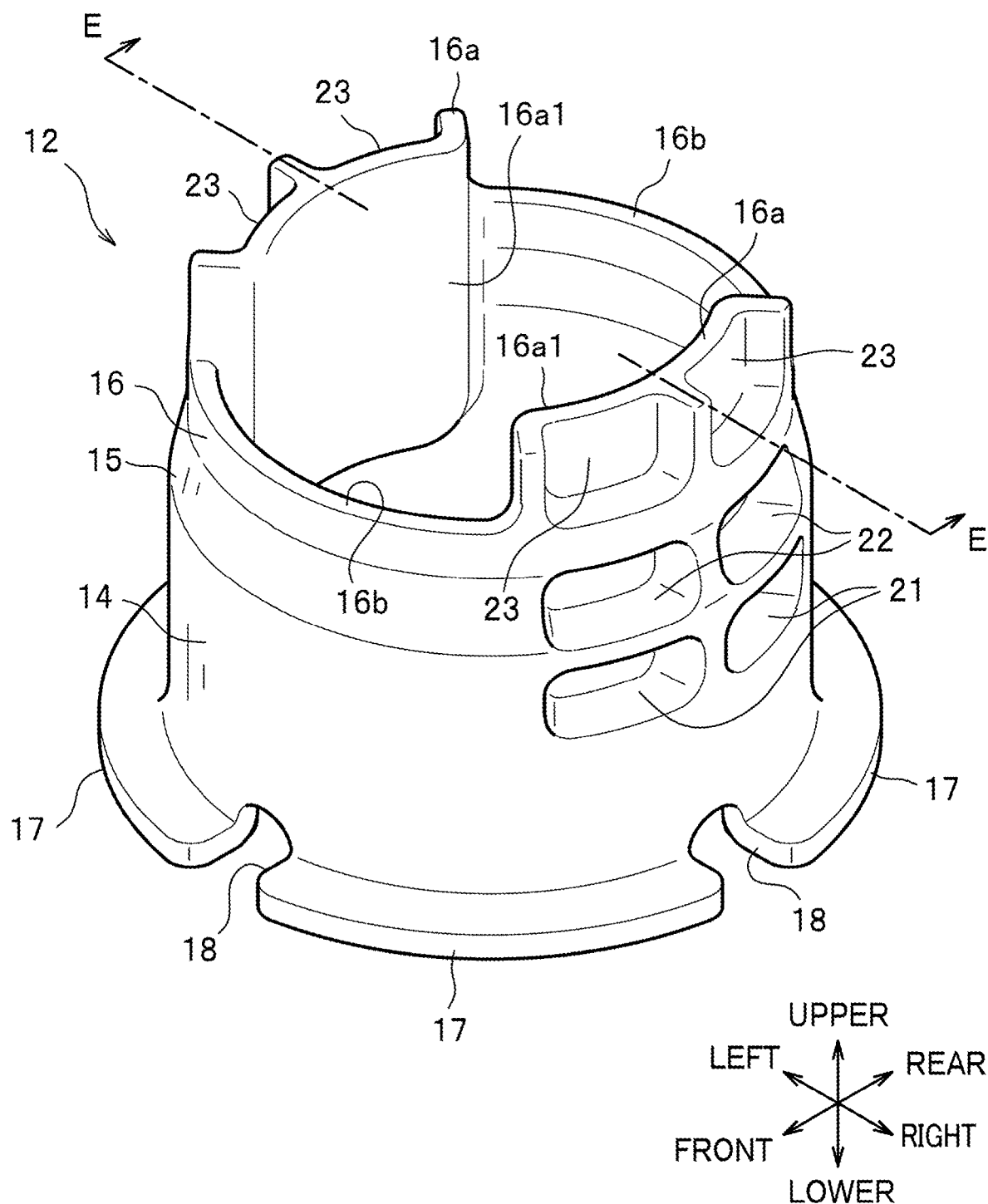
FIG. 5 is a perspective view showing an outer cylinder.
Figure 6A:
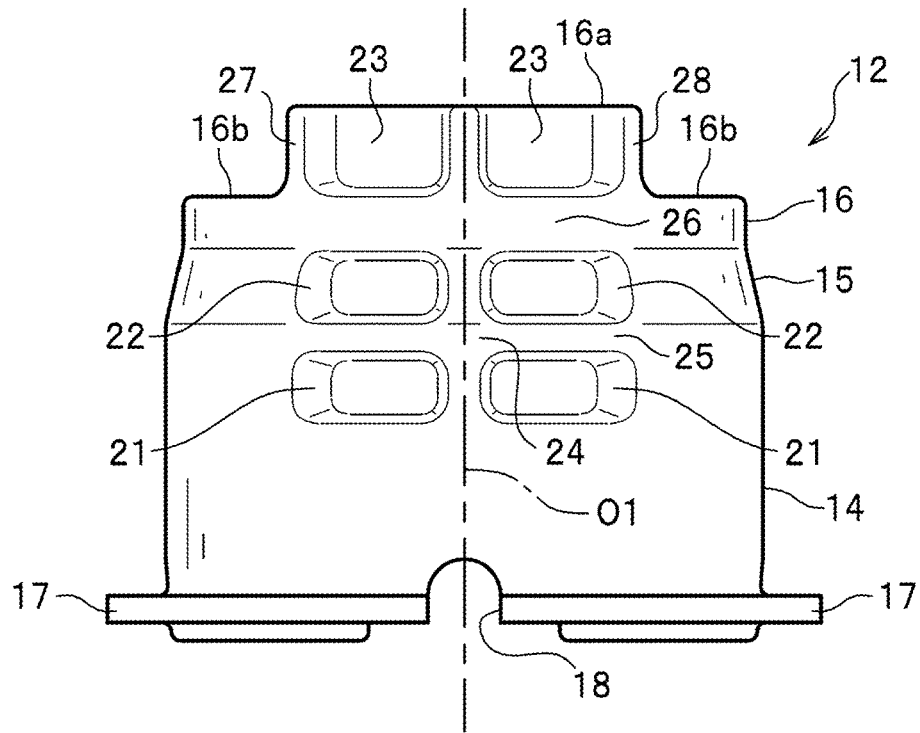
FIG. 6A is a side view of the outer cylinder.

As shown in FIGS. 5, 6A, 7A and 7B, the outer cylinder 12 includes: a press fitted part 14; a drawn part 15 continuing from the an upper end of the press fitted part 14; and a cylindrical part 16 continuing from an upper end of the drawn part 15. As shown in FIGS. 5 and 6A, the outer cylinder 12 includes recessed parts 21 to 23 which are set further back in a radial direction of the outer cylinder 12 than the rest of the outer cylinder 12. The recessed parts 21 to 23 are provided in left and right surfaces in an outer peripheral surface of the outer cylinder 12, and extend inward in the radial direction. Multiple recessed parts 21 are provided in the press fitted part 14; multiple recessed parts 22 are provided in the drawn part 15; and the multiple recessed parts 23 are provided in the cylindrical parts 16. In addition, FIGS. 5 and 6A show the recessed parts 21 to 23 provided in the right surface. Details of recessed parts 21 to 23 will be described later.

Figure 8:
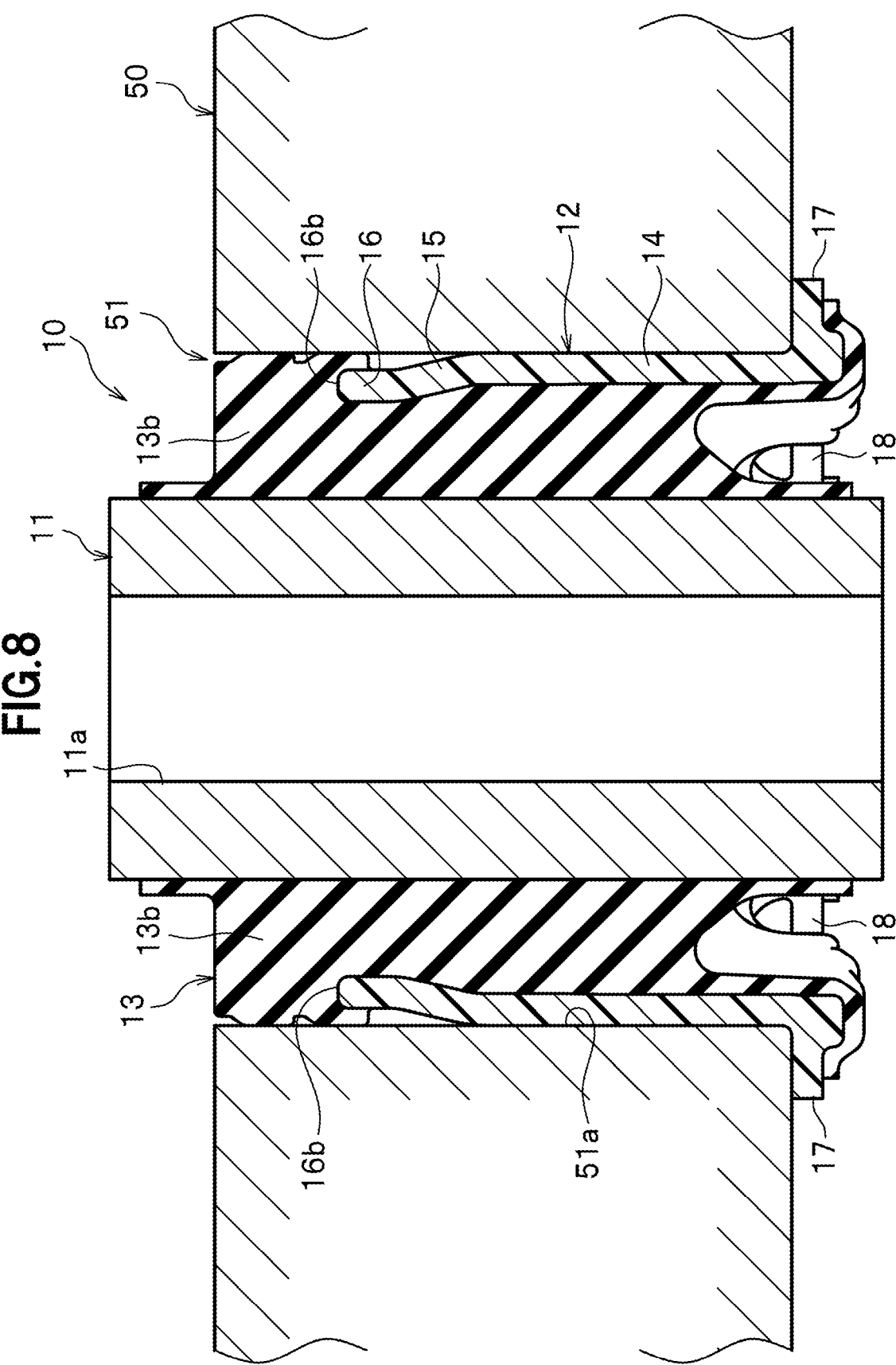
FIG. 8 is a cross-sectional view showing how the vibration-damping device is fitted into an attachment insertion hole of an attachment member.

In this respect, as shown in FIG. 8, the attachment member 50 (the holder) includes the attachment insertion hole 51. The attachment insertion hole 51 includes a cylindrical inner surface 51a. The outer cylinder 12 of the vibration-damping device 10 is press-fitted to the inner surface 51a.

[Press Fitted Part of Outer Cylinder]

Figure 7A:
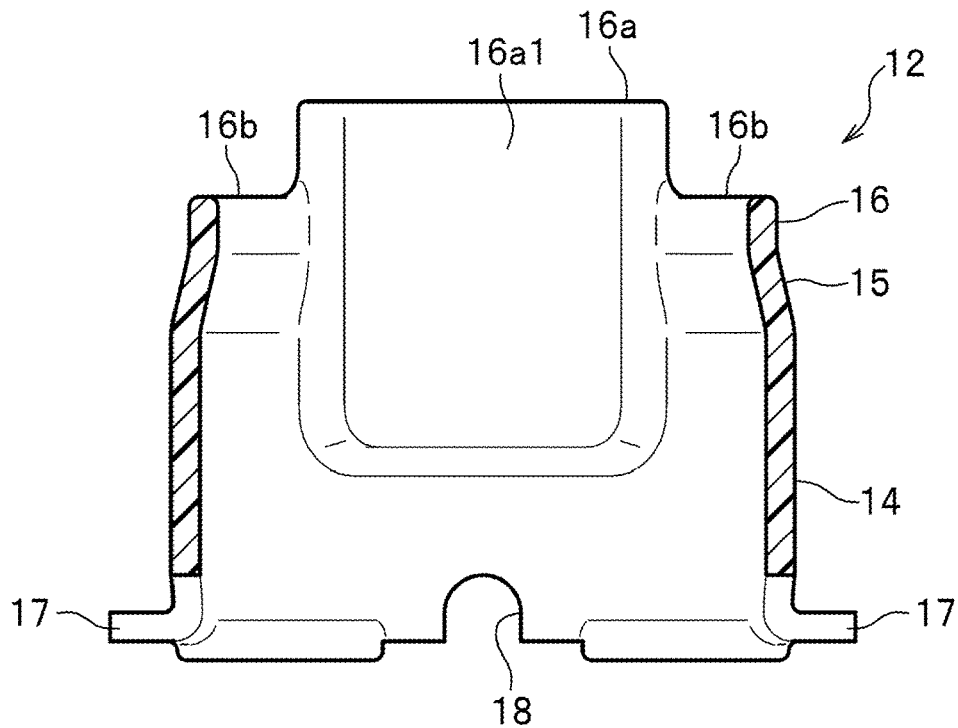
FIG. 7A is a cross-sectional view taken along the D-D line of FIG. 6B.

The press fitted part 14 is a part which is press-fitted into the attachment insertion hole 51 of the attachment member 50 (the holder). The press fitted part 14 is a large-diameter part whose diameter is larger than that of the cylindrical part 16. As shown in FIGS. 6A and 7A, external dimensions of the press fitted part 14 are set constant from an upper end to a bottom end of the press fitted part 14 in the axial direction. As shown in FIGS. 5 and 6A, the drawn part 15 is formed continuing from the upper end of the press fitted part 14. Flange parts 17 are formed integrally on an outer peripheral surface of a lower end portion of the press fitted part 14. The lower end portion of the press fitted part 14 is an end portion in a direction opposite to a press fitting direction in which the press fitted part 14 is press-fitted into the attachment insertion hole 51 of the attachment member 50. The multiple recessed parts 21 are formed in the left and right surfaces in the outer peripheral surface of the press fitted part 14. Details of the recessed parts 21 will be described later.

[Flange Parts of Outer Cylinder]

As shown in FIG. 5, the flange parts 17 jut outward in the radial direction from the lower end portion of the press fitted part 14. As shown in FIG. 8, the flange parts 17 are in contact with an opening edge of the attachment insertion hole 51 while the vibration-damping device 10 is fitted to the attachment insertion hole 51 of the attachment member 50 (the holder). As shown in FIG. 5, cut parts 18 are formed between the flange parts 17.

[Cut Parts Between Flange Parts in Outer Cylinder]

Figure 6B:
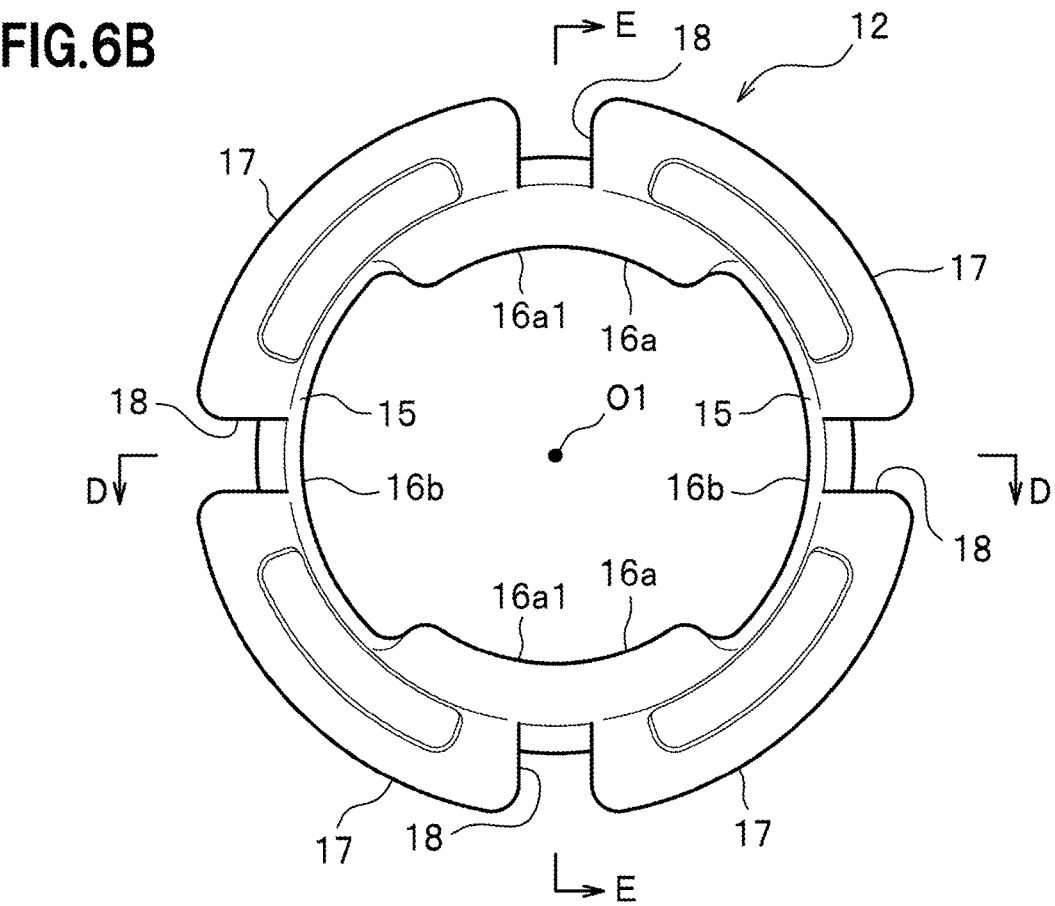
FIG. 6B is a bottom view of the outer cylinder.

As shown in FIG. 6B, four cuts parts 18 in total are formed between the flange parts 17 at intervals of 90 degrees in a circumferential direction of the flange. The four cut parts 18 divide the flange into the four flange parts 17 in the circumferential direction. A radial-direction inner portion of each cut part 18 is cut in an upward-facing arc which penetrates into the lower end portion of the press fitted part 14 (see FIG. 5A). In other words, the cut parts 18 are formed extending from the outer peripheral ends of the flange parts 17 to the lower end portion of the press fitted part 14.

As discussed later, in a case where stress occurs in the flange parts 17 during the press fitting into the attachment insertion hole 51 of the attachment member 50 (the holder), the cut parts 18 like this playa role of scattering and attenuating the stress. Furthermore, in the case where stress occurs in the press fitted part 14 during the press fitting into the attachment insertion hole 51 of the attachment member 50 (the holder), the cut parts 18 also play a role of dispersing and attenuating the stress, since the cut parts 18 are formed extending from the outer peripheral ends of the flange parts 17 to the lower end portion of the press fitted part 14.

[Drawn Part of Outer Cylinder]

As shown in FIG. 5, the drawn part 15 continues from the press fitted part 14, and is tapered with its diameter becoming smaller. Specifically, the drawn part 15 has a tapered shape which makes the diameter of the drawn part 15 becomes smaller from the upper end portion of the press fitted part 14 and upward toward the lower end portion of the cylindrical part 16. As shown in FIGS. 6A and 7A, an outer surface of the drawn part 15 inclines inward in the radial direction. The cylindrical part 16 is formed continuing from the upper end of the drawn part 15. The multiple recessed parts 22 are formed in the drawn part 15, like the recessed parts 21 formed in the press fitted part 14. Details of the recessed parts 22 will be described later.

[Cylindrical Part of Outer Cylinder]

The cylindrical part 16, which is a small-diameter part, extends to its upper end from the small-diameter end portion of the drawn part 15, and is formed in the shape of a cylinder. A direction in which the cylindrical part 16 extends coincides with the press fitting direction in which the press fitted part 14 is press-fitted to the attachment member 50. An outer diameter of the cylindrical part 16 is smaller than that of the press fitted part 14, and is smaller than an inner diameter of the attachment insertion hole 51 of the attachment member 50 (the holder).

As shown in FIGS. 5, 6A and the like, the cylindrical part 16 includes: projecting parts 16a formed therein to project in the axial direction of the cylindrical part 16; and recess-shaped parts 16b formed therein to be set back in the radial direction of the cylindrical part 16 relative to the projecting parts 16a.

[Projecting Parts of Cylindrical Part of Outer Cylinder]

A pair of projecting parts 16a are formed facing each other in the radial direction in a front-rear direction of the cylindrical part 16. The projecting parts 16a are each formed wide in a circumferential direction of the cylindrical part 16. The multiple recessed parts 23 are formed in each projecting part 16a, like the recessed parts 21 formed in the press fitted part 14 and the recessed parts 22 formed in the drawn part 15. Details of the recessed parts 23 will be described later.

Figure 3B:
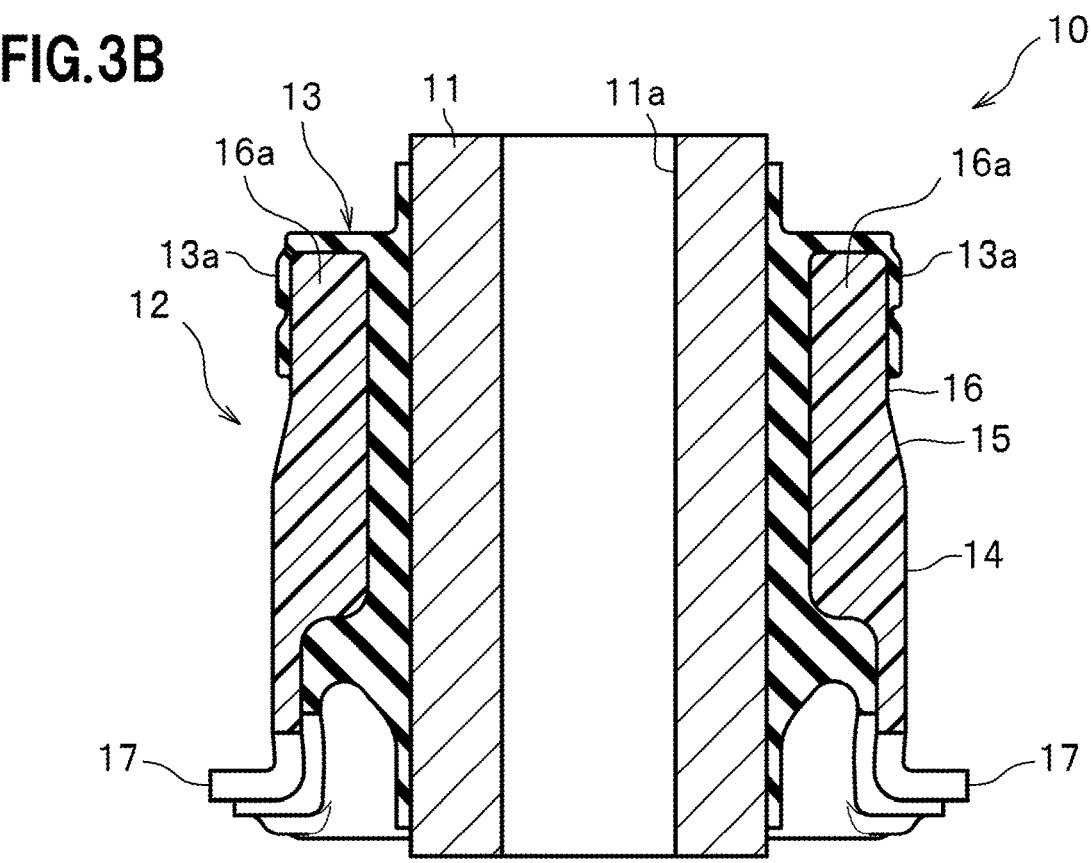
FIG. 3B is a cross-sectional view taken along the B-B line of FIG. 2B.

External dimensions of each projecting part 16a are set constant throughout the full length of the projecting part 16a. As shown in FIG. 3B, an outer surface of each projecting part 16a is thinly covered with an extension part 13a (described later) of the rubber elastic body 13. The projecting part 16a like this is in contact with the inner surface 51a (see FIG. 8) of the attachment insertion hole 51 of the attachment member 50 (the holder) with the rubber elastic body 13 in between.

[Recess-Shaped Parts of Cylindrical Part in Outer Cylinder]

Figure 7B:
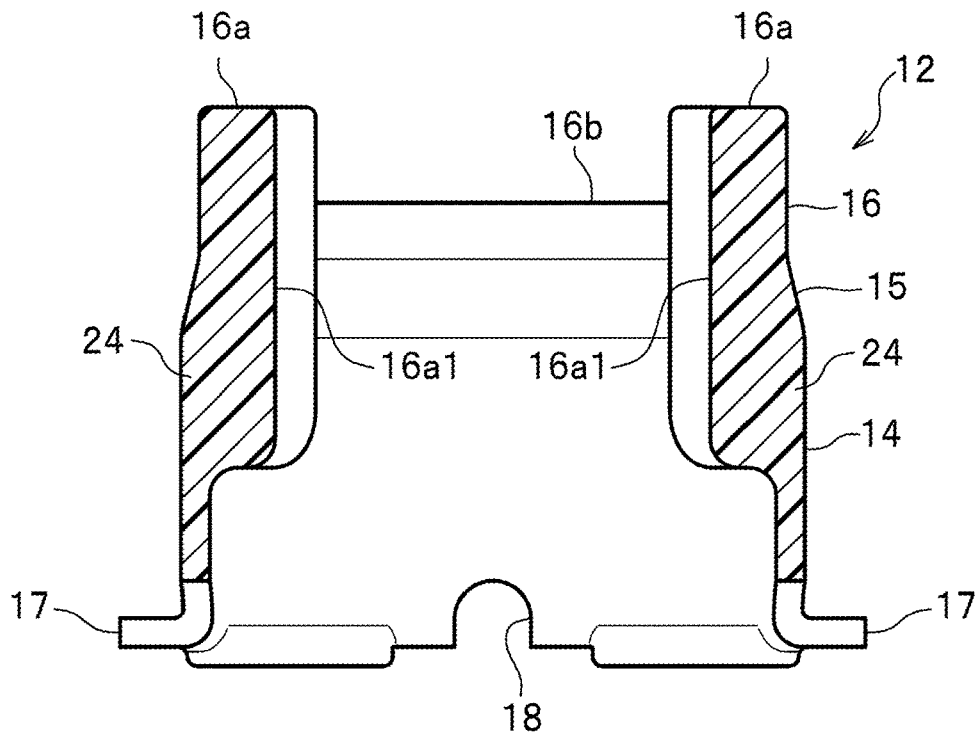
FIG. 7B is a cross-sectional view taken along E-E line of FIG. 6B.

A pair of recess-shaped parts 16b are formed facing each other in the radial direction in the left-right direction of the cylindrical part 16. The recess-shaped parts 16b, 16b are formed between the projecting parts 16a, 16a in the circumferential direction of the cylindrical part 16. Each recess-shaped part 16b is formed wide in the circumferential direction of the cylindrical part 16, and in a substantially C-shaped cross section, as shown in FIGS. 5 and 7B. The recess-shaped part 16b functions as a space in which to arrange an upper thick part 13b (described later) of the rubber elastic body 13, as shown in FIGS. 3A and 4.

[Recessed Parts in Outer Cylinder]

The multiple recessed parts 21 to 23 are provided in the left and right surfaces in the outer peripheral surface of the outer cylinder 12 such that the recessed parts 21, the recessed parts 22 and the recessed parts 23 are arranged, respectively, in the press fitted part 14, the drawn part 15 and the cylindrical part 16 in the upper-lower direction. The recessed parts 21 to 23 are set further back in the radial direction of the outer cylinder 12 than the rest of the outer cylinder 12. The recessed parts 21 to 23 in the left surface in the outer peripheral surface of the outer cylinder 12 have the same structure as the recessed parts 21 to 23 in the right surface therein. The following descriptions will be provided for the recessed parts 21 to 23 in the right surface by referring to FIGS. 5 and 6A.

The recessed parts 21 are provided in an axial-direction upper portion of the outer peripheral surface of the press fitted part 14 which is closer to the drawn part 15. The recessed parts 22 are arranged above the recessed parts 21, and are provided in the outer peripheral surface of the drawn part 15. Furthermore, the recessed parts 23 are arranged above the recessed part 22, and are provided in the projecting part 16a of the cylindrical part 16. In the right surface view, the recessed parts 21 to 23 are arranged such that the two sides of a center line O1 of the press fitted part 14 are each provided with a set of one recessed part 21, one recessed part 22 and one recessed part 23.

Each recessed part 21 in the press fitted part 14 is formed substantially in the shape of a rectangle whose short sides extend in a direction along the center line O1, and whose long sides extend in a direction orthogonal to the center line O1, when the center line O1 is used as the reference. The recessed part 21 is surrounded by the front, rear, upper and lower surfaces as well as the left surface serving as the bottom surface, and the right surface is opened. The recessed parts 22 in the drawn part 15 have the same structure as the recessed parts 21 in the press fitted part 14, except that the recessed parts 22 are formed in the inclined surface serving as the drawn part 15. Descriptions for the recessed parts 22, therefore, are omitted.

The recessed parts 23 are formed in a predetermined rectangular shape which, depending on the height of the projecting part 16a, is vertically longer than the rectangular shape common to the recessed parts 21, 22. Each recessed part 23 is surround by the front, rear and lower surfaces as well as the left surface serving as the bottom surface, and the right and upper surfaces are opened.

As shown in FIGS. 5B, 6B, 7A, and 7B, an inner side part 16a1 of the outer cylinder 12 (the cylindrical part 16) which forms the left surfaces serving as the bottom surfaces of the recessed parts 21 to 23 juts out further inward in the radial direction than the other inner side part. Thereby, a depth-direction dimension of the recessed parts 21 to 23 is secured while the thickness of the outer cylinder 12 is made substantially constant.

As shown in FIG. 6A, a vertical rib 24 extending in the upper-lower direction along the center line O1 is formed between the recessed parts 21, between the recessed parts 22, and between the recessed parts 23. Furthermore, a horizontal rib 25 extending in the circumferential direction is formed between the recessed parts 21 and the recessed parts 22. In addition, a horizontal rib 26 extending in the circumferential direction is formed between the recessed parts 22 and the recessed parts 23. Moreover, a front vertical rib 27 and a rear vertical rib 28 are formed, respectively, in the front and rear sides of the group of the recessed parts 23, 23. The forming of the ribs 24 to 28 like this secures strength of the left and right surfaces in the outer peripheral surface of the outer cylinder 12. This secures particularly strength of the projecting parts 16a, 16a which jut out from the cylindrical part 16.

Besides, as shown in FIG. 6A, in the right surface view, one cut part 18 is arranged on a lower extension line of the center line O1. As shown in FIG. 7A, similarly, another cut part 18 is arranged under an intermediate portion between the recess-shaped parts 16b, 16b.

[Rubber Elastic Body]

As shown in FIGS. 3A, 3B and 4, the rubber elastic body 13 is provided between the inner cylinder 11 and the outer cylinder 12, and elastically connects the inner cylinder 11 and the outer cylinder 12. The rubber elastic body 13 is cured and bonded to the outer peripheral surface of the inner cylinder 11 and the inner peripheral surface of the outer cylinder 12, for example, by: pouring molten rubber into an interstice between the inner cylinder 11 and the outer cylinder 12 set in a mold (not shown); and cooling the rubber. The poured molten rubber is also supplied to the outer surfaces of the projecting parts 16a, 16a of the cylindrical part 16 in the outer cylinder 12. Thus, the outer surfaces of the projecting parts 16a, 16a are covered with the thin extension parts 13a of the rubber elastic body 13. The existence of the projecting parts 16a, 16a makes spring force higher in the direction in which the projecting parts 16a, 16a face each other than in the direction in which the recess-shaped parts 16b, 16b face each other.

The poured molten rubber is further supplied to the pair of recess-shaped parts 16b, 16b of the cylindrical part 16. Thereby, as shown in FIG. 3A, the upper thick parts 13b, 13b where the rubber elastic body 13 is formed thick in the radial direction are formed between the recess-shaped parts 16b, 16b and the outer peripheral surface of the inner cylinder 11. Since the upper thick parts 13b, 13b are formed thick, the upper thick parts 13b, 13b are suitable to absorb relatively large vibration.

[Fitting of Vibration-Damping Device to Attachment Member]

When the vibration-damping device 10 is going to be fitted to the attachment member 50 (the holder), the cylindrical part 16, one end of the outer cylinder 12 of the vibration-damping device 10 is made to face the insertion port of the attachment insertion hole 51 of the attachment member 50 (the holder), and the vibration-damping device 10 is brought closer to the insertion port.

Thereafter, the cylindrical part 16 of the outer cylinder 12 is inserted into the attachment insertion hole 51 through the insertion port, and the outer cylinder 12 are pressed using a press fitting jig (not shown). Thereby, the press fitted part 14 enters the attachment insertion hole 51, and the press fitted part 14 is press-fitted to the inner surface of the attachment insertion part 51 (see FIG. 8). In other words, the vibration-damping device 10 is fixed to the attachment member 50 (the holder) while producing force which presses the outer cylinder 12 inward in the radial direction.

It should be noted that while the vibration-damping device 10 is fixed to the attachment insertion hole 51, the extension part 13a of the rubber elastic body 13 covering the projecting parts 16a of the cylinder part 16 of the outer cylinder 12 is in contact with the inner surface of the attachment insertion hole 51 of the attachment member 50 (the holder). Thereby, the attachment insertion hole 51 is securely sealed with the outer cylinder 12.

It is preferable that the fitting of the vibration-damping device 10 to the attachment member 50 be done, for example, with the recess-shaped parts 16b, 16b facing each other in the front-rear direction of the vehicle body of the automobile, and concurrently with the projecting parts 16a, 16a facing each other in the left-right direction of the vehicle body. Because of the fitting like this, the upper thick parts 13b, 13b of the rubber elastic body 13 which are arranged on the recess-shaped parts 16b, 16b are capable of favorably absorbing large vibration which is inputted when the automobile accelerates and decelerates. In addition, the rubber elastic body 13 whose spring force is increased by the existence of the projecting parts 16a, 16a is capable of favorably absorbing vibration which works in the left-right direction of the vehicle body.

The above-discussed vibration-damping device 10 according to the present invention makes it possible to increase the spring force of the rubber elastic body 13 because of the existence of the projecting parts 16a in the cylindrical part 16. This makes it possible to favorably absorb load which is inputted into the vibration-damping device 10. Meanwhile, portions of the rubber elastic body 13, which correspond to the recess-shaped parts 16b in the cylindrical part 16, no longer get caught between or bonded to the inner cylinder 11 and the outer cylinder 12. In other words, the upper thick parts 13b of the rubber elastic body 13, which are arranged in the recess-shaped parts 16b, do not get caught by the inner cylinder 11 or the outer cylinder 12, and accordingly, residual stress is less likely to occur. The residual stress is, therefore, less influential even in a case where load which largely displaces the upper thick parts 13b of the rubber elastic body 13, which are arranged in the recess-shaped parts 16b, is inputted. This makes it possible to achieve an enhancement in the durability of the rubber elastic body 13.

It should be noted that the cylindrical part 16 is a part to which load is likely to be applied while the vibration-damping device 10 is in operation. For this reason, the vibration-damping device 10 according to the embodiment, having the structure which makes residual stress less likely to occurs in this part, is effective in achieving an enhancement in the performance and an improvement in the durability.

Furthermore, in the vibration-damping device 10 according to the embodiment, the outer cylinder 12 is provided with the recessed parts 21 to 23 which are recessed in the radial direction of the outer cylinder 12. This makes it possible to increase strength of the outer cylinder 12. The recessed parts 21 are provided in the press fitted part 14 of the outer cylinder 12; the recessed parts 22 are provided in the drawn part 15 of the outer cylinder 12; and the recessed parts 23 are provided in the projecting parts 16a in the cylindrical part 16 of the outer cylinder 12. This makes it possible to increase the strength of the outer cylinder 12 from the press fitted part 14 to the drawn part 15 and the projecting parts 16a of the cylindrical part 16. Moreover, the vibration-damping device 10 according to the embodiment makes it possible to form the outer cylinder 12 whose thickness is substantially even across the outer cylinder 12, unlike the outer cylinder 12 which would be formed thicker in order to increase the strength. This makes shrinkage in the molded resin substantially constant across the outer cylinder 12, and makes it possible to inhibit the occurrence of sink marks and voids.

Here, the "voids" mean empty spaces which are formed through solidification around bubbles caused during the production of the outer cylinder 12.

Although the foregoing descriptions have been provided for the embodiment of the present invention, the present invention is not limited to the embodiment, and can be modified variously.

For example, although shown as being formed in the substantially C-shaped cross section, the recess-shaped parts 16b are not limited to this shape, and may employ various shapes as long as the recess-shaped parts 16b function, respectively, as the spaces in which to arrange the upper thick parts 13b of the rubber elastic body 13.

Moreover, although in the foregoing embodiment, the recessed parts 21 are provided in the press fitted part 14; the recessed parts 22 are provided in the drawn part 15; and the recessed parts 23 are provided in the projecting parts 16a of the cylindrical part 16, the provision of the recessed parts 21 to 23 is not limited to this example. The recessed parts 21 to 23 may be provided to one or two of the press fitted part 14, the drawn part 15 and the cylindrical part 16.

Besides, the recessed parts 21 to 23 may employ various shapes as long as the recessed parts 21 to 23 are capable of increasing the strength of the left and right surfaces in the outer peripheral surface of the outer cylinder 12, in other words, as long as the recessed parts 21 to 23 are capable of increasing the spring force by increasing the strength of the portions of the outer cylinder 12 into which loads are inputted from the left and right directions. Incidentally, depending on a vehicle to which the present invention is applied, the arrangement may be such that: the projecting parts 16a, 16a and the recessed parts 21 to 23 are provided in portions of the outer cylinder 12 in the front-rear directions of the vehicle; and the recess-shaped parts 16b, 16b are provided in portions of the outer cylinder 12 in the left and right directions of the vehicle.

Moreover, the application of the present invention is not limited to the application to the cylinder-shaped vibration-damping device 10. The present invention is applicable to square tube-shaped, oval cylinder-shaped, and various cylinder-shaped vibration-damping devices.

REFERENCE SIGNS LIST

10: vibration-damping device
11: inner cylinder
12: outer cylinder
13: rubber elastic body
14: press fitted part
15: drawn part
16: cylindrical part
16a: projecting part
16b: recess-shaped part
21 to 23: recessed part
50: attachment member (holder)
51: attachment insertion hole

The invention claimed is:

1. A vibration-damping device comprising:
an inner cylinder;
a resin-made outer cylinder arranged outside the inner cylinder in a radial direction; and
a rubber elastic body connecting the inner cylinder and the outer cylinder, wherein
the outer cylinder includes
a press fitted part to be press-fitted into an attachment insertion hole formed in an attachment member,
a drawn part continuing from the press fitted part, and tapered with its diameter becoming smaller, and
a cylindrical part extending from a small-diameter end portion of the drawn part in a press-fitting direction to an upper end of the outer cylinder,
the cylindrical part includes projecting parts which jut out in an axial direction of the cylindrical part,
the projecting parts are formed in a pair in a radial direction of the cylindrical part, and
the press fitted part, the drawn part, and the projecting part include recessed parts which are recessed in a radial direction of the outer cylinder.

* * * * *